(12) United States Patent
Miyoshi

(10) Patent No.: US 6,181,471 B1
(45) Date of Patent: Jan. 30, 2001

(54) ILLUMINATING SYSTEM FOR IMAGE PROCESSING MEASURING APPARATUS

(75) Inventor: Kazuhiko Miyoshi, Hiroshima (JP)

(73) Assignee: Mitutoyo Corporation, Kanagawa (JP)

( * ) Notice: Under 35 U.S.C. 154(b), the term of this patent shall be extended for 0 days.

(21) Appl. No.: 09/199,201

(22) Filed: Nov. 25, 1998

(30) Foreign Application Priority Data

Dec. 2, 1997 (JP) .................................................. 9-331713

(51) Int. Cl.⁷ .................................................. G02B 21/06
(52) U.S. Cl. ........................ 359/388; 359/385; 359/387
(58) Field of Search ........................... 359/368, 372–373, 359/379–381, 385–390

(56) References Cited

U.S. PATENT DOCUMENTS

| | | | |
|---|---|---|---|
| 3,398,630 | * 8/1968 | Dakin | 359/385 |
| 4,687,304 | * 8/1987 | Piller et al. | 359/388 |
| 4,779,967 | * 10/1988 | Murphy et al. | 359/387 |
| 4,974,094 | * 11/1990 | Morito | 359/385 |
| 5,249,077 | * 9/1993 | Laronga et al. | 359/385 |
| 5,312,393 | * 5/1994 | Mastel | 359/385 |
| 5,325,231 | * 6/1994 | Tamura et al. | 359/381 |
| 5,668,665 | 9/1997 | Choate | 359/663 |
| 5,690,417 | 11/1997 | Polidor et al. | 362/244 |
| 5,748,367 | 5/1998 | Lucke et al. | 359/385 |

FOREIGN PATENT DOCUMENTS

| | | | |
|---|---|---|---|
| 3100662 | * 11/1981 | (DE) | 359/387 |
| 57-111508 | * 7/1982 | (JP) | 359/385 |
| 63-194217 | * 8/1988 | (JP) | 359/385 |
| 4-86614 | * 3/1992 | (JP) | 359/385 |

* cited by examiner

Primary Examiner—Thong Nguyen

(57) ABSTRACT

An illuminating system for an image processing measuring apparatus according to the present invention is composed on an inclined-incident illuminating device B mounted removably to a body tube and projecting obliquely a luminous flux to an object to be measured, a ring-shaped incident illuminating device mounted removably to the body tube and projecting a ring-shaped luminous flux to the object other than a vertical-incident illuminating device projecting the luminous flux emitted from an optical source from the direction just above the object, and a switching for switching the luminous flux emitted from the light source to either of the inclined-incident illuminating device and the ring-shaped incident illuminating device. As a result, there is proved the illuminating system for an image processing measuring apparatus by which an illumination suitable for a shape or a contour of an object to be measured can be selected from the group consisting of vertical-incident illumination, inclined-incident illumination, and ring-shaped illumination. The illuminating system for an image processing measuring apparatus is excellent in ease of operation, and is constructed economically in a compact size.

5 Claims, 7 Drawing Sheets ical system. More specifically, the invention

ILLUMINATING SYSTEM FOR IMAGE PROCESSING MEASURING APPARATUS

BACKGROUND OF THE INVENTION FIELD

1. Field of the Invention

The present invention relates to an illuminating system for an image processing measuring apparatus used for measuring dimension, shape or contour and the like of an object based on an image of the object which has been measured by means of an optical system. More specifically, the invention relates to an illuminating system for an image processing measuring apparatus wherein illumination to be applied to an object is adapted to be capable of selecting from a group consisting of vertical-incident illumination, inclined-incident illumination, and ring-shaped incident illumination.

2. Prior Art

In an image processing measuring apparatus wherein a site measured in an object is optically magnified by means of a magnifying optical system, whereby dimension, shape or contour and the like of the object are measured from the magnified image, for example, measuring microscope, tool maker's microscope, projector or the like, illumination with respect to the object to be measured has a very important function from the viewpoint of attaining a clear magnified image of such object. Heretofore, a vertical-incident illuminating system wherein illuminating light is projected upon an object from the direction substantially directly above the object has been known as an illuminating system in such type of the image processing measuring apparatus as described above. However, such vertical-incident illuminating systems are utilized in most cases where an object having a comparatively simple shape is measured, so that if an object having a complicated contour such as a step-shaped object having a number of edge sections, is measured, a shadow of such edge sections cannot be clearly displayed on a display unit or the like.

In this respect, to solve the above described disadvantage, there has been proposed an image processing measuring apparatus wherein an inclined-incident illuminating device having a separate light source from that typically used in the image processing measuring apparatus, or a ring-shaped incident illuminating device having similarly a separate light source from that of the measuring apparatus is mounted on the measuring apparatus main body, and an image of the object measured is obtained by illumination derived from these illuminating devices.

In the above-mentioned inclined-incident illuminating device or ring-shaped incident illuminating device, however, since a separate light source from that involved in an image processing measuring apparatus is required, it becomes expensive, and labor intensive because it is difficult to mount the light sources to the measuring apparatus main body in a prescribed posture. Furthermore, in such an arrangement that an inclined-incident illuminating device and a ring-shaped incident illuminating device were mounted to the measuring apparatus main body at the time of initially assembling the whole apparatus, the apparatus itself becomes large in size and difficult to operate because all the illuminating devices are not always required necessarily dependent upon applications of the image processing measuring apparatus.

OBJECT AND SUMMARY OF THE INVENTION

The present invention has been made in view of the problems as described above involved in the prior art.

Accordingly, an object of the present invention is to provide an illuminating system for an image processing measuring apparatus in which any of vertical-incident illumination, inclined-incident illumination, and ring-shaped incident illumination can be selected to serve the same for use, and further which is excellent in operability, and, which can be constructed in a compact and economical manner.

The illuminating system for an image processing measuring apparatus according to the present invention is characterized by comprising a measuring apparatus main body having a table on which is placed an object to be measured; a vertical-incident illuminating device involving a light source and projecting the luminous flux emitted from the aforesaid light source from the direction just above the aforesaid object; an inclined-incident illuminating device mounted removably to the aforesaid measuring apparatus main body and projecting a luminous flux on the aforesaid object from an inclined direction; a ring-shaped incident illuminating device mounted removably to the aforesaid measuring apparatus main body and projecting a ring-shaped luminous flux on said object; and switching means for switching the luminous flux emitted from the aforesaid light source from the aforesaid vertical-incident illuminating device to either of the aforesaid inclined-incident illuminating device and the aforesaid ring-shaped incident illuminating device.

According to the constitution as described above, since it is constituted in such that the inclined-incident illuminating device and the ring-shaped incident illuminating device are removable with respect to the measuring apparatus main body provided with the vertical-incident illuminating device, such illumination suitable for the contour of an object to be measured can be selected from the group consisting of vertical-incident illumination, inclined-incident illumination, and ring-shaped incident illumination. In addition, since these illuminating devices are removable with respect to the measuring apparatus main body, the apparatus is extremely easy to operate, and compact in construction.

Furthermore, since the switching means for switching the luminous flux emitted from a light source of the vertical-incident illuminating device to either the inclined-incident illuminating device or the ring-shaped incident illuminating device, the light source for the vertical-incident illuminating device may be commonly used for the inclined-incident illuminating device and the ring-shaped illuminating device. For this reason, the measuring apparatus of the present invention can be constituted more economically than that in the case where inclined-incident illumination and ring-shaped incident illumination are conducted on the basis of light sources which are separately provided from that of the vertical-incident illuminating device as in the prior art.

In the above described constitution, it is preferred that only any one of the inclined-incident illuminating device and the ring-shaped illuminating device is removably mounted to the measuring apparatus through an adaptor lens for converting a diameter of the luminous flux emitted from the aforesaid light source to that of a predetermined diameter.

According to the arrangement as described above, the inclined-incident illuminating device and the ring-shaped incident illuminating device can be selectively mounted to the measuring apparatus main body through the adaptor lens, so that no working for mounting individually the inclined-incident illuminating device and the ring-shaped incident illuminating device to the measuring apparatus main body is required. In other words, since one adaptor lens can function as a mount which can be commonly used for the inclined-incident illuminating device and the ring-shaped incident illuminating device, it is possible to make the measuring apparatus simpler from the structural point of view as well as to make the measuring apparatus more economical than that of the prior art. In addition, since a diameter of the luminous flux emitted from the light source may be adapted to be the one suited to the inclined-incident illuminating device and the ring-shaped illuminating device by means of the adaptor lens, the luminous flux from the light source can effectively be utilized.

Moreover, it is preferred that the above described switching means is disposed with respect to the optical path derived from the aforesaid light source in an insertable and retractable manner, and the switching means is composed of an optical path switching mirror for switching the luminous flux emitted from the light source to either of the aforesaid inclined-incident illuminating device and the ring-shaped incident illuminating device dependent upon a position of the switching means disposed. In this case, it may be arranged in such a manner that an optical path switching lever is coupled to the optical path switching mirror, and the optical path switching lever is adapted to be pushed and pulled with respect to the measuring apparatus main body in order to constitute the optical path switching mirror so as to be insertable and retractable with respect to the optical path from the light source.

According to such arrangement as described above, the luminous flux from the light source can be switched to the inclined-incident illuminating device or the ring-shaped incident illuminating device by means of a simple operation of only inserting and retracting the optical path switching mirror with respect to the optical path from the light source, besides, the arrangement can be simply and easily constituted.

Furthermore, it is preferred that the above described inclined-incident illuminating device comprises a light-receiving section mounted removably to the aforesaid measuring apparatus main body in an optical path to which is switched the luminous flux derived from the light source by the aforesaid switching means and dividing the aforesaid luminous flux into two fluxes, and a pair of optical fiber cables introducing the respective luminous fluxes divided in the aforesaid light-receiving section from the side of an end of the optical fiber cables, while projecting obliquely outputting luminous fluxes from the other end thereof to said object to be measured.

According to such constitution as described above, it is possible that the luminous flux emitted from the light source is divided into two fluxes, and the respective luminous fluxes are projected obliquely to an object to be measured from the opposite sides thereof. In this case, it is preferred that the other ends of the optical fiber cables are provided with projecting sections, respectively, they are held at a predetermined angle by means of a fixing plate, and at the same time, the fixing plate is secured to, for example, the outer circumference of an objective lens.

Moreover, it is preferred that the above described ring-shaped incident illuminating device comprises a light-receiving section mounted removably to the aforesaid measuring apparatus main body in an optical path to which is switched the luminous flux derived from the light source by the aforesaid switching means, and a plurality of optical fibers introducing the luminous flux received by the aforesaid light-receiving section from the side of an end of the optical fibers, while the other end thereof is disposed in an annular ring-shaped manner centering around the optical axis of the aforesaid vertical-incident illuminating device.

According to such constitution as described above, a ring-shaped luminous flux can be obtained by such a simple arrangement wherein a plurality of optical fibers are simply disposed in an annular ring-shaped manner. In this case, it is arranged in such a manner that when the plurality of optical fibers are bundled and are contained in a ring-shaped member, and in addition that when the ring-shaped member is mounted fixedly to the outer circumference of an objective lens, a point of beam condensation in the ring-shaped luminous flux can be allowed to match easily to the optical axis of the objective lens.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

An exemplary embodiment according to the present invention will be described hereinafter by referring to the accompanying drawings.

Figure 1:
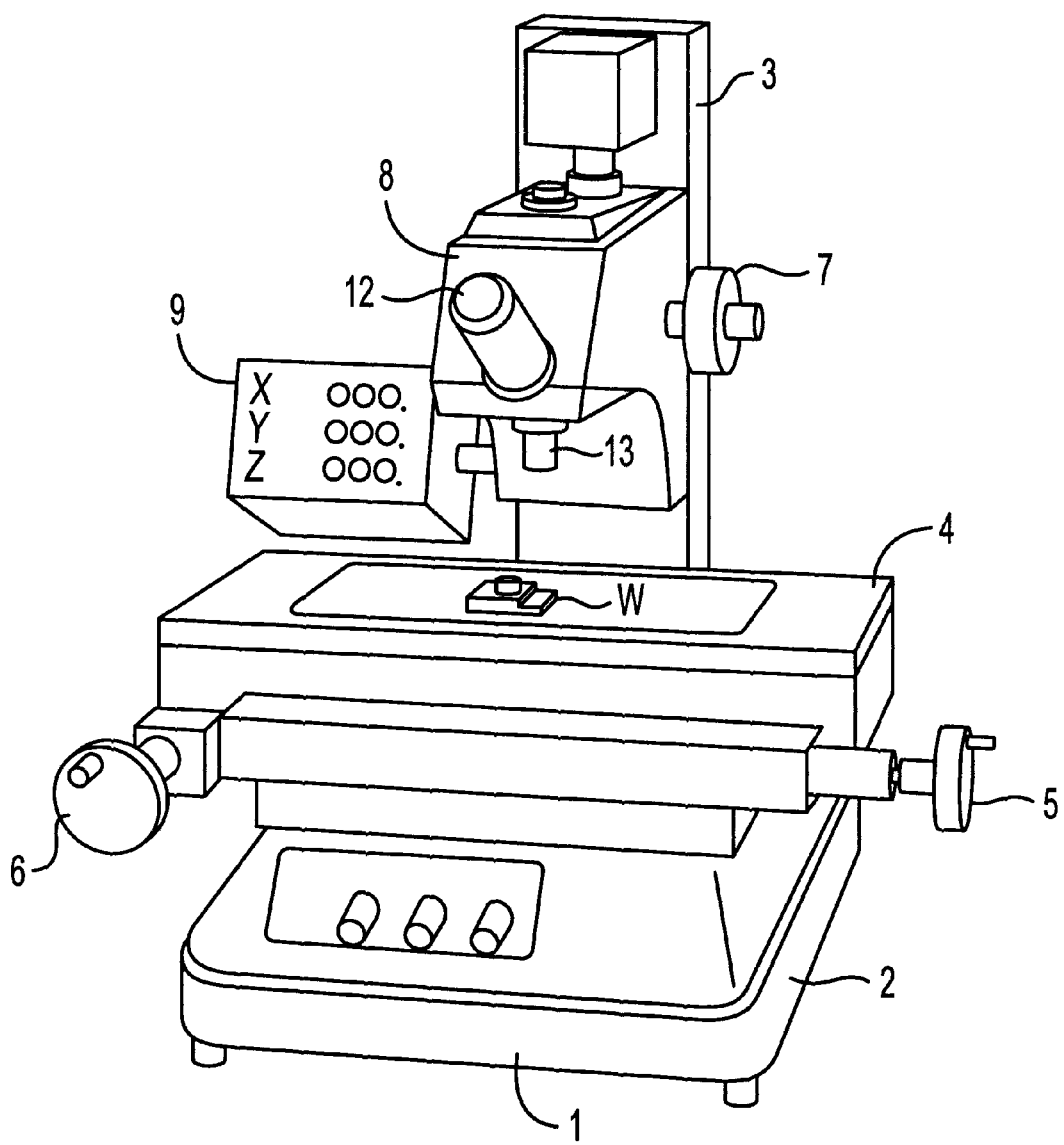
FIG 1 is a perspective view showing a measuring microscope according to an exemplary embodiment of the present invention.

FIG. 1 is a perspective view showing a measuring microscope to which has been applied the present invention wherein the measuring microscope include a main body 1 composed of a base 2 and a column 3 projected vertically therefrom. The base 2 is provided with a table 4 on the upper surface of which is placed an object W to be measured, and further the interior of the base is provided with a transmittable illuminating device (not shown). The table 4 is composed of an X-Y table which is transferred by operation of rotating operating handles 5 and 6 along two axial directions intersecting at right angles in a horizontal plane, i.e., right and left directions (direction in X-axis) as well as back and forth directions (direction in Y-axis), respectively. The column 3 is provided with a body tube 8 being liftable along up and down directions (direction in Z-axis) by rotating operation of an operating handle 7, and further provided with an indicator 9 for indicating a traveling amount along the respective axial directions (X-, Y-, and Z-axial directions), respectively.

Figure 2:
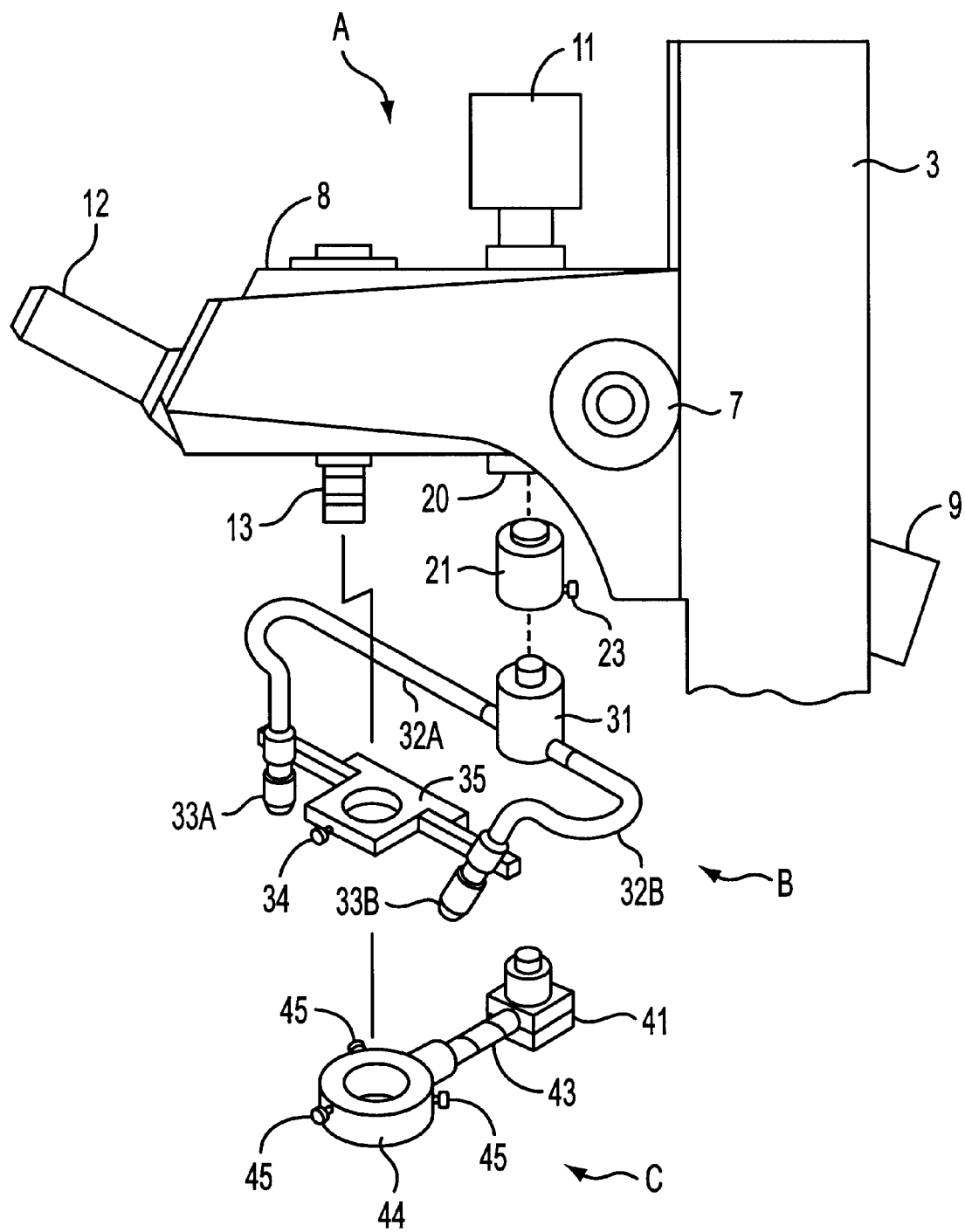
FIG. 2 is a partial side view showing an essential part of the embodiment shown in FIG. 1.
Figure 3:
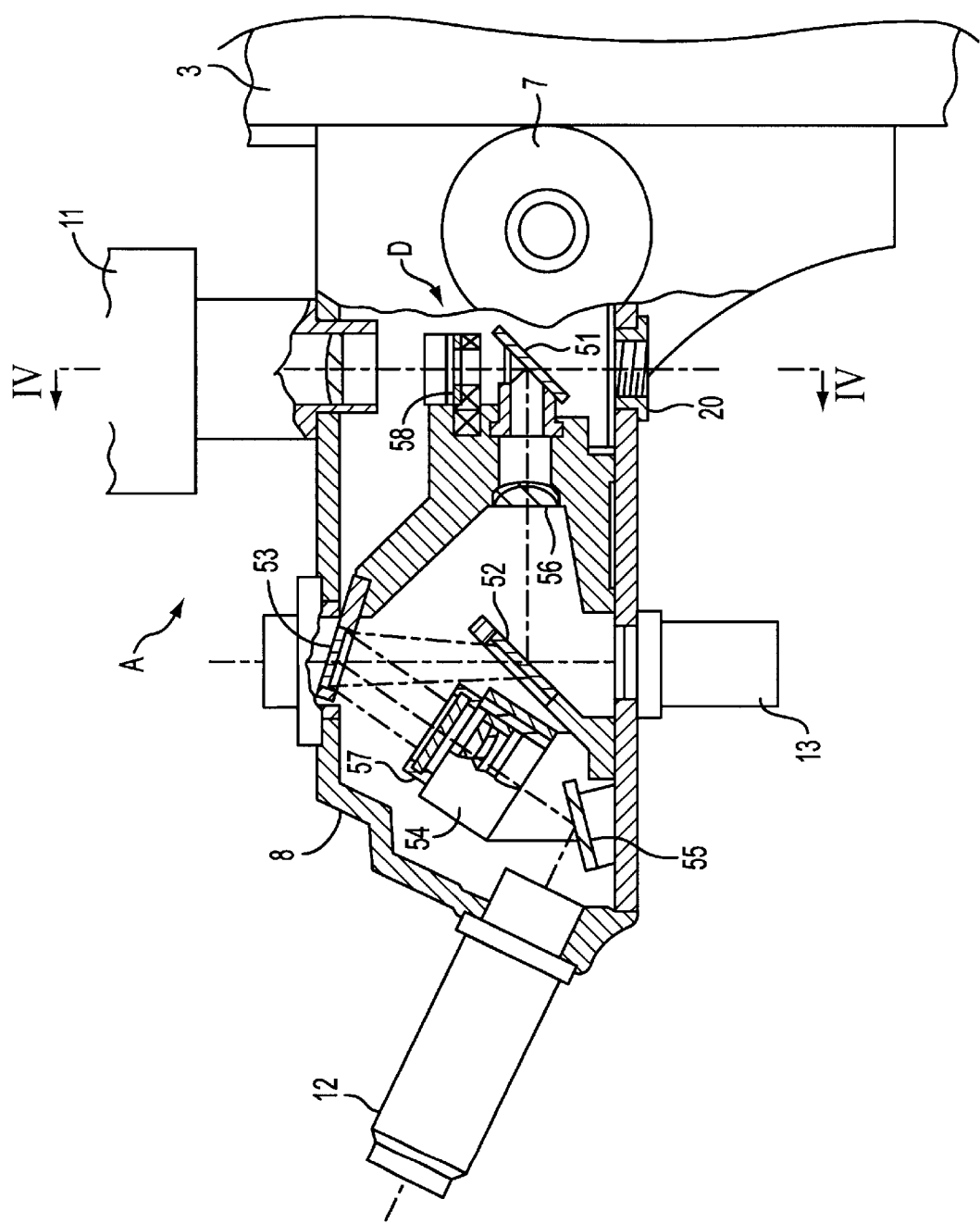
FIG. 3 is a sectional view showing the inside of a body tube in the embodiment shown in FIG. 1.

To the body tube 8 is mounted a light source 11 on the upper surface thereof, an eyepiece 12 on the front thereof, and an objective lens 13 on the lower surface thereof, respectively, as shown in FIGS. 2 and 3. Moreover, inside the body tube 8, an optical path switching mirror 51 is placed just below the light source 11, and half mirrors 52 and 53 are placed on the optical axis of the aforesaid objective lens 13, respectively, besides a field lens 54, a mirror 55, a relay lens (not shown), and the like which lead reflected light from the half mirror 53 to the eyepiece 12 are successively placed between the half mirror 53 and the eyepiece 12. In addition, a lens 56 is disposed between the optical path switching mirror 51 and the half mirror 52 as well as a reticle 57 is disposed between the half mirror 53 and the field lens 54, respectively. A vertical-incident illuminating device A projecting the luminous flux emitted from the light source 11 to an object W to be measured from the direction just above the object is herein composed of the light source 11, the optical path switching mirror, and the half mirrors 52.

Moreover, an aperture diaphragm 58 is placed between the light source 11 and the optical path switching mirror 51, and further to the bottom wall (the lower surface of the body tube 8) positioned at a site lower than that of the aperture diaphragm is screwed movably an adaptor lens 21 containing a condenser lens therein through a nut member 20 provided with a female screw, the condenser lens functioning to convert a diameter of the luminous flux emitted from the light source 11 to a predetermined diameter of the luminous flux.

Figure 4:
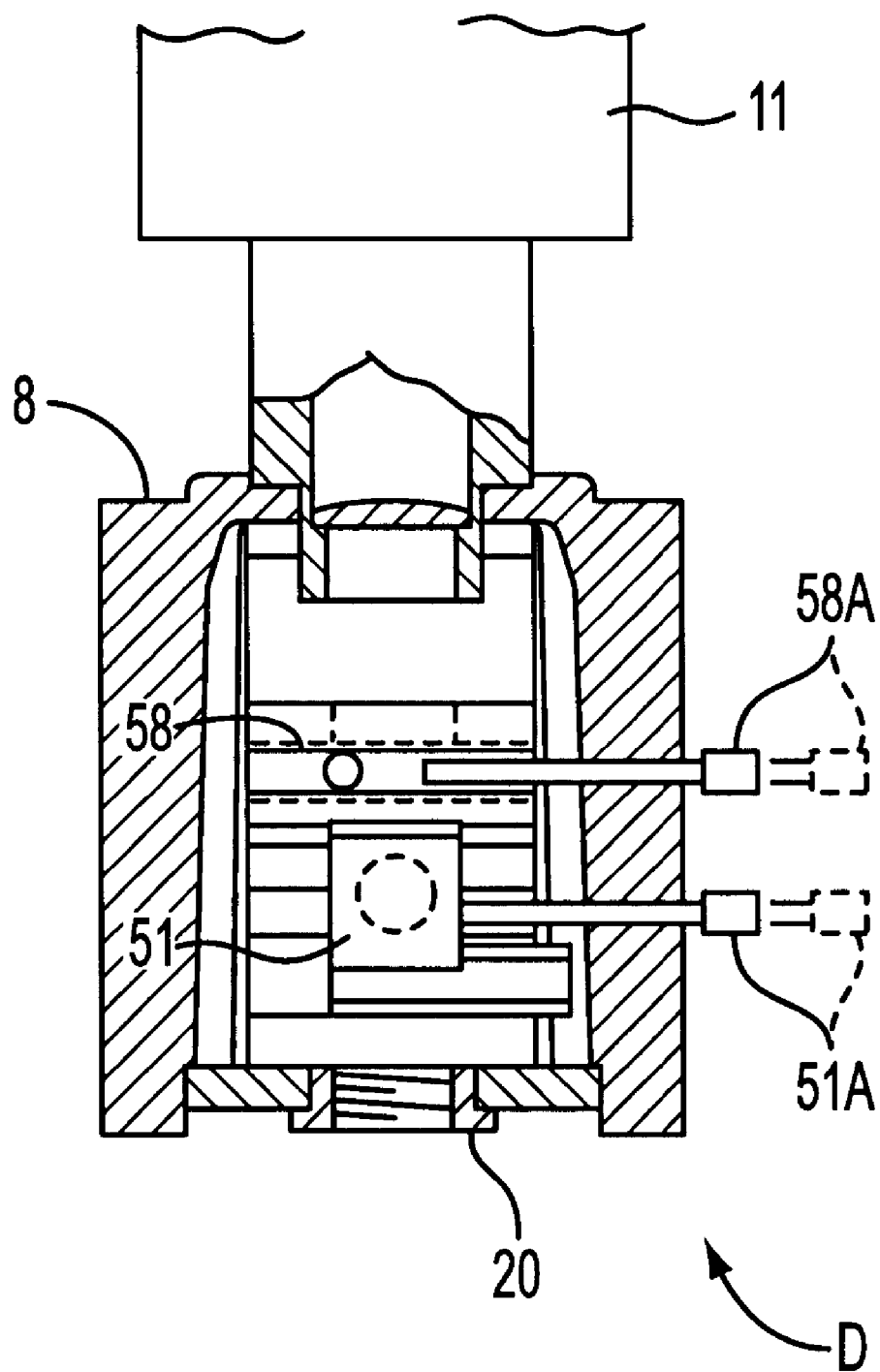
FIG. 4 is a sectional view taken along the line IV—IV of FIG. 3.

The adaptor lens 21 is adapted to be constituted in such a manner that the inclined-incident illuminating device B projecting obliquely a luminous flux with respect to the object W on the table 4 and the ring-shaped incident illuminating device C projecting a ring-shaped luminous flux with respect to the object W on the table 4 are selectively removable. Furthermore, the aforesaid optical path switching mirror 51 is constituted so as to be insertable and retractable with respect to the optical path extended from the light source 11 in such a manner that the luminous flux from the aforesaid light source 11 is switched to either of the inclined-incident illuminating device B and the ring-shaped illuminating device C each of which is to be mounted to the adaptor lens 21. More specifically, the positioning of the optical path switching mirror 51 is adapted to be switched by pushing and pulling an optical path switching lever 51A disposed on a side of the body tube 8 as shown in FIG. 4. Namely, a switching means D comprises the optical path switching mirror 51 and the optical path switching lever 51A. In FIG. 4, reference character 58A designates an aperture diaphragm lever for making the aforesaid aperture diaphragm 58 variable.

Figure 5:
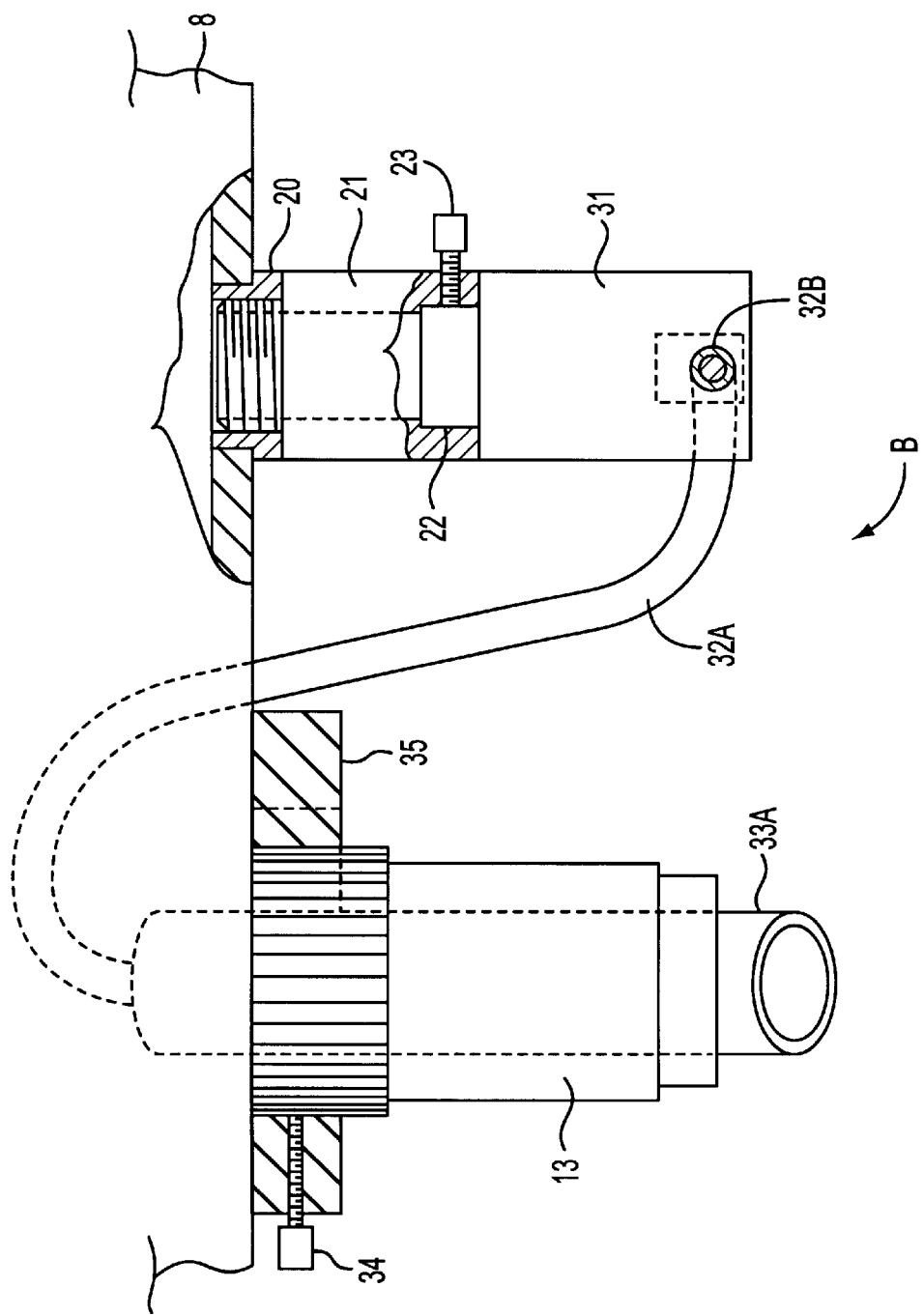
FIG. 5 is a view showing a state wherein an inclined-incident illuminating device in the embodiment shown in FIG. 1 is mounted to the body tube.

As is also clear from FIG. 5, the aforesaid inclined-incident illuminating device B is inserted removably into an optical path to which is switched the optical path extended from the light source 11, in other words, it is inserted removably in a bottom fitting hole 22 of the aforesaid adaptor lens 21, and the former is secured to the latter by means of a set screw 23. Furthermore, the inclined-incident illuminating device B is composed of a light-receiving section 31 for dividing the luminous flux derived from the light source 11 into two fluxes, a pair of optical fiber cables 32A and 32B each having an end which is coupled to the light-receiving section 31 and from each of these ends is introduced each luminous flux divided in the light-receiving section 31, light-projecting sections 33A and 33B each of which is attached to each of the other ends of the respective optical fiber cables 32A and 32B and each of which contains a lens therein, and a fixing plate 35 for holding both the light-projecting sections 33A and 33B at a predetermined angle (an angle at which illumination is obliquely projected to the object W) and fixed to the outer circumference of the aforesaid objective lens 13 by means of a set screw 34.

Figure 6:
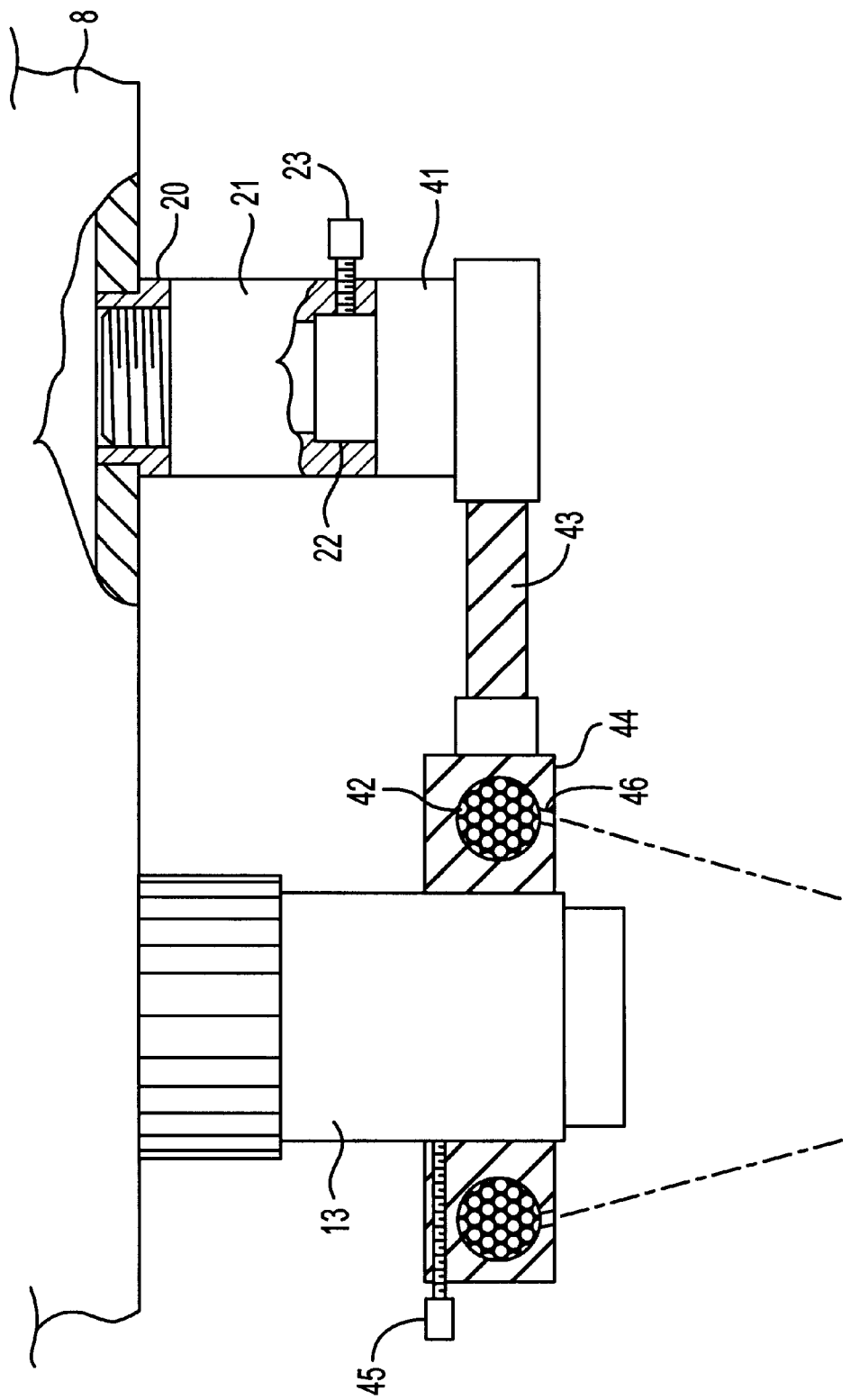
FIG. 6 is a view showing a state wherein a ring-shaped incident illuminating device in the embodiment shown in FIG. 1 is mounted to the body tube.
Figure 7:
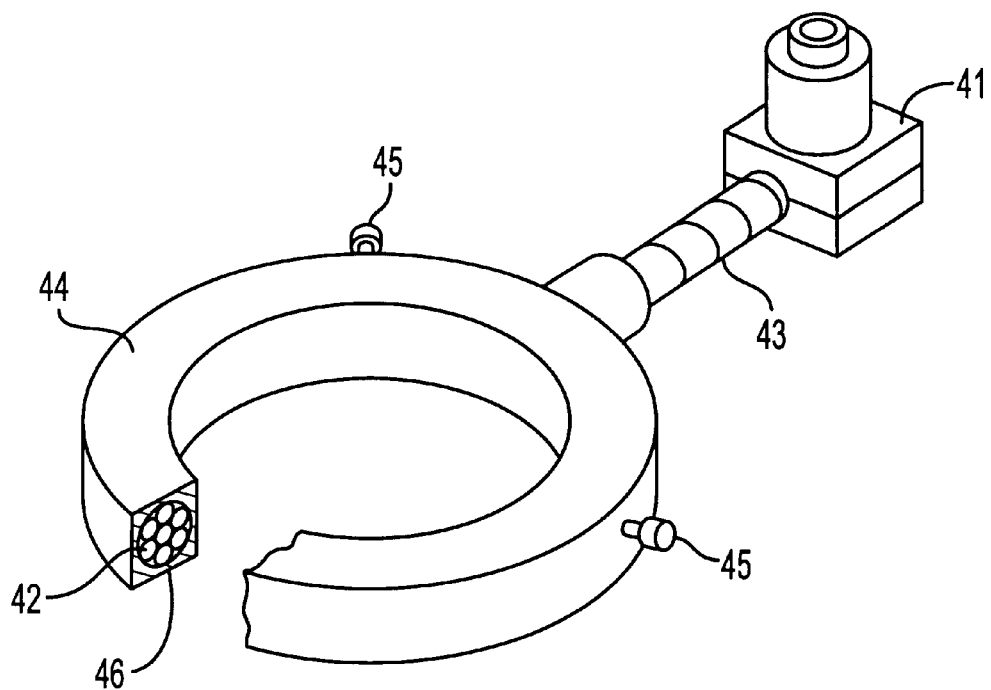
FIG. 7 is a perspective view showing the ring-shaped incident illuminating device in the embodiment shown in FIG. 1.
Figure 8:
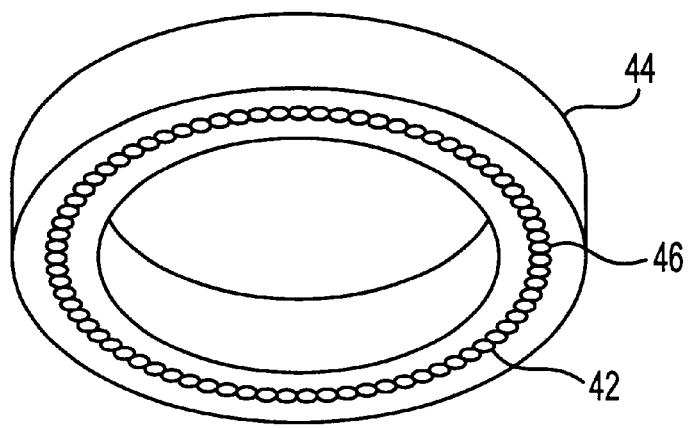
FIG. 8 is a perspective view viewed from the bottom of the ring-shaped incident illuminating device in the embodiment shown in FIG. 1.

As is clear also from FIGS. 6 and 7, the aforesaid ring-shaped illuminating device C comprises a light-receiving section 41 which is removably inserted in the bottom fitting hole 22 of the aforesaid adaptor lens 21 and attached thereto by means of a set screw 23, a plurality of optical fibers 42 each one end of which is allowed to face on the light-receiving section 41 to introduce the luminous flux received by the light-receiving section 41 from the side of the one end thereof, a ring-shaped member 44 which is coupled to the aforesaid light-receiving section 41 through a flexible pipe 43 and the inside of which contains the aforesaid plurality of optical fibers 42 in a bundled and an annular ring-shaped state, and a set screw for fixing the ring-shaped member 44 to the outer circumference of the aforesaid objective lens 13. Moreover, an annular groove 46 is defined on the lower surface of the ring-shaped member 44 so as to incline with respect to the optical axis of the objective lens 13, and extreme ends of the plurality of optical fibers 42 are aligned one by one in the annular groove 46 in an annular ring shape as shown in FIG. 8. Since the present invention is constituted as described above, the object W to be measured is placed on the table 4 in case of measurement, and then illumination suitable for the contour of the object W is selected from the group of consisting of vertical-incident illumination, inclined-incident illumination, and ring-shaped incident illumination.

For instance, in case of vertical-incident illumination, an electric power supply of the light source 11 is turned ON under a situation where the optical path switching mirror 51 is positioned in the optical path extended from the light source 11 in FIG. 3, in other words, it is in a state where the optical path switching lever 51A has been pushed in. As a result, the luminous flux from the light source 11 is reflected by the optical path switching mirror 51, then, reflected by the half mirror 52, and thereafter, the luminous flux is projected to the object W from the direction just above the same via the objective lens 13. The reflected light from the object W is lead from the objective lens 13 to the half mirror 53 through the half mirror 52, then, reflected by the half mirror 53, thereafter the reflected light is lead to the eyepiece 12 through the field lens 54 and the mirror 55, and the resulting reflected light is observed by the eyepiece 12. In this case, it is also possible to observe the transmitted light from the half mirror 53 by means of television or camera.

In this situation, a site of the object W to be measured is successively registered with, for example, cross line or the like of the reticle 57 while transferring the table 4 along the directions of X- and Y-axes as well as transferring the body tube 8 along the direction of Z-axis. In this occasion, an amount transferred in each of the axes (X-, Y-, and Z-axes) is read from the indicator 9, whereby a dimension and a shape in the site of the object W to be measured are determined.

On one hand, in case of inclined-incident illumination, the adaptor lens 21 is screwed with the nut member 20, thereafter, the light-receiving section 31 of the inclined-incident illuminating device B is fitted to the fitting hole 22 of the adaptor lens 21, and they are fixed with the set screw 23 as shown in FIG. 5.

Furthermore, the outer circumference of the objective lens 13 is mounted by the fixing plate 35, and they are secured with the set screw 34. In this condition, the optical path switching lever 51A is pulled out, so that the luminous flux emitted from the light source 11 is divided into two luminous fluxes in the light-receiving section 31, and then, the respective luminous fluxes thus divided are projected to the object W from the light-projecting sections 33A and 33B though the optical fiber cables 32A and 32B, respectively. Thus, illumination is projected obliquely to the object W, so that a clear image can be obtained from a groove, a convex, or the like pattern.

Moreover, in case of ring-shaped incident illumination, the adaptor lens 21 is screwed with the nut member 20, thereafter, the light-receiving section 41 of the ring-shaped incident illuminating section 41 is fitted to the fitting hole 22 of the adaptor lens 21, and they are fixed with the set screw 23 as shown in FIG. 6. Furthermore, the outer circumference of the objective lens 13 is mounted by the ring-shaped member 44, and they are secured with the set screw 45. In this condition, the optical path switching lever 51A is pulled out, so that the luminous flux emitted from the light source 11 is projected from the light-receiving section 41 to the object W via the optical fibers 42 wherein the luminous flux is projected to the object W through the extreme ends thereof. In other words, a ring-shaped luminous flux is projected to the object W to be measured, so that a clear image can be obtained from a circular groove, a circular projection or the like circular pattern.

Thus, according to the present embodiment, a measuring microscope provided with the vertical-incident illuminating device A and a transmittable illuminating device (not shown) is constituted in such a manner that to which can be selectively and removably mounted the inclined-incident illuminating device B and the ring-shaped incident illuminating device C. Accordingly, such illumination suitable for a contour of the object W to be measured can be selectively used from vertical-incident illumination, inclined-incident illumination, and ring-shaped illumination.

In this case, since it is constituted in such a manner that the nut member 20 is mounted to the body tube 8, and the inclined-incident illuminating device B or the ring-shaped incident illuminating device C is selectively and removably mounted to the aforesaid nut member 20 through the adaptor lens 21, no working for mounting together the inclined-incident illuminating device B with the ring-shaped illuminating device C to the body tube 8 is necessary. In other words, one nut member 20 functions for both the inclined-incident illuminating device B and the ring-shaped illuminating device C as a mounting section, so that the illuminating system according to the present invention can be constituted economically in a simple structure. Besides, since the adaptor lens 21 is provided with a condenser lens so as to make a diameter of the luminous flux emitted from the light source 11 coincident with each diameter of the optical fibers contained in the inclined-incident illuminating device B and the ring-shaped incident illuminating device C, the luminous flux emitted from the light source 11 can be effectively utilized.

Furthermore, since the switching means D for switching the luminous flux derived from the light source 11 of the vertical-incident illuminating device A to that of the inclined-incident illuminating device B or the ring-shaped incident illuminating device C is disposed, the light source 11 of the vertical-incident illuminating device A may be commonly used for that of the inclined-incident illuminating device B and the ring-shaped incident illuminating device C.

For this reason, the illuminating system according to the present invention can be constituted more economically than the case where inclined-incident illumination and ring-shaped incident illumination is conducted by means of separate light sources as in the prior art. In addition, since the switching means D is constituted in such that the optical path switching mirror 51 disposed just below the light source 11 is insertable in and retractable from the optical path extended from the light source 11 by means of pushing and pulling the optical path switching lever 51A, such optical path can be switched by a simple operation and a simple structure.

Moreover, the inclined-incident illuminating device B comprises the light-receiving section 31 for dividing the luminous flux derived from the light source 11 into two fluxes, a pair of optical fiber cables 32A and 32B each one end of which is coupled to the light-receiving section 31, and a fixing plate 35 for holding both the light-projecting sections 33A and 33B at a predetermined angle and fixing them to the outer circumference of the objective lens 13, the light-projecting sections 33A and 33B each of which being attached to each the other end of the respective optical fiber cables 32A and 32B. Accordingly, a luminous flux can be projected obliquely to the object W to be measured from the opposite sides thereof by the above described inclined-incident illuminating device B. Besides, since the fixing plate 35 holding the light-projecting sections 33A and 33B has such a structure wherein it is mounted to the outer circumference of the objective lens 13, both the light-projecting sections 33A and 33B can be stably supported thereby.

On the other hand, the ring-shaped illuminating device C comprises the light-receiving section 41, the plurality of optical fibers 42 each one end of which is allowed to face on the light-receiving section 41, and a ring-shaped member 44 which contains these plurality of optical fibers 42 in a bundled and an annular ring-shaped state; and further, the ring-shaped illuminating device C has such constitution that extreme ends of the plurality of optical fibers 42 are aligned one by one in an annular ring shape on the lower surface of the ring-shaped member 44. Hence, a ring-shaped luminous flux can be obtained by such simple structure as described above. In addition, since the ring-shaped member 44 is fixedly mounted to the outer circumference of the objective lens 13 by means of the set screw 45, a point of beam condensation in ring-shaped luminous flux can be allowed to match easily to the optical axis of the objective lens 13. Moreover, since the light-receiving section 41 is coupled to the ring-shaped member 44 through the flexible pipe 43, in the case when the ring-shaped member 44 is mounted to the outer circumference of the objective lens 13, the former is easily secured fittingly to the latter.

While the above-mentioned manner of practice has been described in conjunction with a measuring microscope having a structure wherein the reflected light from the object W is measured while observing the same by means of the eyepiece 12, the present invention may also be applied to such a microscope wherein the reflected light from an object is measured by displaying on a display unit which is separately provided.

Furthermore, although a measuring microscope has been described in the aforementioned manner of practice, the invention is not limited thereto, it is also applicable for a projector and the like.

In addition, constitutions of the inclined-incident illuminating device B and the ring-shaped illuminating device C are not limited to those described in the aforesaid embodiment, but any other constitutions may be utilized so far as a constitution has such a structure wherein a luminous flux can be projected obliquely to the object W to be measured with respect to the inclined-incident illuminating device B as well as so far as a constitution has such a structure wherein a ring-shaped luminous flux can be projected to the object W to be measured in respect of the ring-shaped incident illuminating device C.

According to the illuminating system for an image processing measuring apparatus of the present invention, any of vertical-incident illumination, inclined-incident illumination, and ring-shaped incident illumination can be selectively used, and in addition, the illuminating system is excellent in ease of operation, and is constructed economically in a compact size.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An illuminating system for an image processing measuring apparatus, comprising a measuring apparatus main body having a table on which is placed an object to be measured; a vertical-incident illuminating device including a light source adapted to project a luminous flux emitted from said light source from a direction just above said object; an inclined-incident illuminating device removably mounted to said measuring apparatus main body and adapted to project a luminous flux on said object from an inclined direction; a ring-shaped incident illuminating device removably mounted to said measuring apparatus main body and adapted to project a ring-shaped luminous flux on said object; and switching means for switching the luminous flux emitted from said light source from said vertical-incident illuminating device to either of said inclined-incident illuminating device and said ring-shaped incident illuminating device.

2. An illuminating system for an image processing measuring apparatus as claimed in claim 1, wherein only either of said inclined-incident illuminating device and said ring-shaped incident illuminating device is removably mounted to said measuring apparatus main body through an adaptor lens for providing a diameter of the luminous flux emitted from said light source to be a predetermined diameter.

3. An illuminating system for an image processing measuring apparatus as claimed in claim 1, wherein said switching means comprises an optical path switching mirror disposed insertably and retractably with respect to an optical path extended from said light source and adapted to switch the luminous flux emitted from said light source to either of said inclined-incident illuminating device and said ring-shaped illuminating device dependent upon a position thereof disposed.

4. An illuminating system for an image processing measuring apparatus as claimed in claim 1, wherein said inclined-incident illuminating device comprises a light-receiving section removably mounted to said measuring apparatus main body in an optical path into which is switched the luminous flux derived from the light source by said switching means and adapted to divide said luminous flux into two fluxes, and a pair of optical fiber cables introducing respective luminous fluxes divided in said light-receiving section from a side of an end of the optical fiber cables, while projecting obliquely the respective luminous fluxes from another end thereof to said object to be measured.

5. An illuminating system for an image processing measuring apparatus as claimed in any on of claims 1, wherein said ring-shaped incident illuminating device comprises a light receiving section removably mounted to said measuring apparatus main body in an optical path into which is switched the luminous flux derived from the light source by said switching means, and a plurality of optical fibers introducing the luminous flux received by said light-receiving section from a side of an end of the optical fibers, while another end thereof is disposed in an annular ring-shaped manner centering around an optical axis of said vertical-incident illuminating device.

* * * * *